United States Patent
Ma et al.

(10) Patent No.: US 10,009,587 B1
(45) Date of Patent: Jun. 26, 2018

(54) REAL-TIME SPATIAL-BASED RESOLUTION ENHANCEMENT USING SHIFTED SUPERPOSITION

(71) Applicant: CHRISTIE DIGITAL SYSTEMS USA, INC., Cypress, CA (US)

(72) Inventors: Bojie Ma, Vaughan (CA); Ahmed Gawish, Waterloo (CA); Alexander Wong, Waterloo (CA); Paul Fieguth, Waterloo (CA); Mark Lamm, Mississagua (CA)

(73) Assignee: CHRISTIE DIGITAL SYSTEMS USA, INC., Cypress, CA (US)

( * ) Notice: Subject to any disclaimer, the term of this patent is extended or adjusted under 35 U.S.C. 154(b) by 0 days. days.

(21) Appl. No.: 15/676,394

(22) Filed: Aug. 14, 2017

(51) Int. Cl.
*H04N 9/31* (2006.01)
*H04N 5/64* (2006.01)
*G06T 5/00* (2006.01)
*G06T 5/20* (2006.01)
*H04N 7/01* (2006.01)

(52) U.S. Cl.
CPC .......... *H04N 9/3188* (2013.01); *G06T 5/003* (2013.01); *G06T 5/20* (2013.01); *H04N 7/0102* (2013.01); *H04N 9/3147* (2013.01); *H04N 9/3182* (2013.01); *H04N 9/3185* (2013.01)

(58) Field of Classification Search
CPC .. H04N 9/31; H04N 5/57; H04N 5/64; H04N 9/3188; H04N 9/3147; H04N 9/3182; H04N 9/3185; H04N 7/0102; G06T 5/003; G06T 5/20

USPC ............... 348/744, 445, 745, 441, 523, 567; 345/650, 661, 676; 382/173, 254, 286
See application file for complete search history.

(56) References Cited

U.S. PATENT DOCUMENTS

| | | | |
|---|---|---|---|
| 6,340,994 B1 | 1/2002 | Margulis et al. | |
| 6,937,772 B2 * | 8/2005 | Gindele | G06T 5/002 375/240.29 |
| 7,228,005 B1 * | 6/2007 | Yuan | G06K 9/40 382/280 |
| 7,747,098 B2 * | 6/2010 | Ward | H04N 19/30 382/232 |
| 7,974,498 B2 * | 7/2011 | Ben-Ezra | G06T 3/4053 382/299 |
| 8,289,454 B2 | 10/2012 | Hasegawa et al. | |
| 8,508,672 B2 | 8/2013 | Russell | |

(Continued)

FOREIGN PATENT DOCUMENTS

WO 2005031645 A1 4/2005

*Primary Examiner* — Trang U Tran
(74) *Attorney, Agent, or Firm* — Perry + Currier, Inc.

(57) ABSTRACT

A projection system for projecting an image with an increased apparent resolution is provided. The projection system includes one or more projectors, a resampler module and a deconvolution module. The resampler module is configured to upsample an incoming high-resolution signal, perform an integer shift operation on a signal, and downsample to two or more low-resolution signals. The deconvolution module is configured to filter the upsampled high-resolution signal using a spatial domain deconvolution operation, the spatial domain deconvolution operation approximating frequency domain optical corrections based on characteristics of the one or more projectors. Preferably, the spatial domain deconvolution operation uses an N×N spatial kernel extracted from a spatial domain approximation of a Wiener filter.

15 Claims, 9 Drawing Sheets

(56) References Cited

U.S. PATENT DOCUMENTS

| | | | |
|---|---|---|---|
| 8,619,189 B2 | 12/2013 | Ito et al. | |
| 9,589,330 B2 * | 3/2017 | Mizuno | G09G 5/04 |
| 9,692,939 B2 * | 6/2017 | Irani | H04N 1/4092 |
| 2014/0267286 A1 * | 9/2014 | Duparre | G09G 3/002 |
| | | | 345/428 |

* cited by examiner

REAL-TIME SPATIAL-BASED RESOLUTION ENHANCEMENT USING SHIFTED SUPERPOSITION

FIELD

The disclosure relates generally to projection systems, and specifically to a spatial-based filter for resolution enhancement in projection systems.

BACKGROUND

High definition (HD) video has become widely available at both consumer and enterprise levels. In the home entertainment industry, for instance, there is a strong consumer interest in the new Ultra HD/4K video technology. However, higher resolution projectors are costly. Alternatively, super-resolution is an image processing research domain, which seeks to produce higher resolution imagery in low resolution contexts.

For example, image and video content can be acquired using cameras at very high resolutions while modern display projectors are very limited in display resolution by comparison. As a result, there is a need to increase the apparent display resolution of projectors. A typical model to enhance the resolution of a projector consists of decomposing the high-resolution signal to multiple lower resolution signals and displaying them with different offsets and, in the case of video, at a higher frame rate.

The super-resolution (SR) problem of producing higher resolution imagery in low resolution contexts is well known in the literature, and different methodologies have been proposed to address this problem.

One class of SR methods uses Fourier Transforms to solve the SR problem. Frequency based SR methods rely on three fundamental principles, 1) the input image is band limited, 2) there is an aliasing relation between continuous Fourier transform (CFT) and discrete Fourier transform (DFT), 3) there exists a shifting property of the Fourier transform. The aliasing relation between CFT and DFT is solved using the least square approach. Frequency-based SR models tend to be sensitive to model errors. Additionally, such models handle translational motions, but non-translation motion significantly degrades the model performance. Moreover, frequency based SR methods are limited to space invariant degradation models, which limits their performance in many real world scenarios where the degradation model varies spatially (e.g. spatially variant point spread function (PSF)). Generally, frequency based SR methods suffer from the limited ability to include spatial domain a-priori knowledge for problem regularization.

Another class of super-resolution methods solves the problem in the spatial domain. Spatial domain SR approaches can accommodate more complex SR-related issues such as global and local motion, spatially varying PSF, motion blur, compression artifacts and more. Examples of spatial domain SR methods include iterative back-projection, non-iterative spatial domain and hybrid method. Stochastic methods, especially Bayesian-based methods, where the SR problem is looked at as a statistical estimation problem, have rapidly gained attention of researchers in the SR field due to their ability to include a-priori constraints (e.g. edge-preserving image prior) to achieve satisfactory solutions of the SR problem. On the other hand, spatial domain based methods are computationally expensive and hence are not suitable for real time applications. Specifically, the inclusion of a-priori constraints is not easily achieved in iterative back-projection related methods. Even stochastic methods, which are known to be a flexible and convenient way to model a priori SR constraints, have the limitation of being unable to reconstruct the high frequency components of images very well.

Additionally, most SR methods (both frequency and spatial based) are time consuming, and hence cannot meet the real-time constraints of SR based applications.

Different image restoration techniques have been developed to correct for optical aberration and recover an approximation of the original image. Conventional methods mainly involve a transformation of the source image by a filter prior to display. However, in most existing approaches, the filtering operation is carried out in the frequency domain which requires complex hardware. Due to the limited processing power in commercial projectors, it is not feasible to achieve frequency-domain optical aberration correction in a real-time implementation.

SUMMARY

In general, this disclosure is directed to a system and method for projecting an image with an increased apparent display resolution. The system includes one or more projectors, a resampler module and a deconvolution module. In some implementations, the deconvolution module uses a N×N spatial kernel comprising a spatial approximation of a frequency domain Wiener deconvolution filter for optical corrections based on characteristics of the one or more projectors, where N is a small odd number (e.g. 3, 5, 7 . . . ). A high-resolution signal is received at the resampler module and upsampled to twice the resolution of the one or more projectors. The deconvolution module filters the signal using the N×N spatial kernel. The resampler module downsamples the filtered signal to two or more low-resolution signals. The two or more low-resolution signals are received at the one or more projectors and superimposed to project an image with an increased apparent display resolution.

In some implementations one projector may display the two or more low-resolution signals sequentially using an opto-mechanical shifter that offsets the projected image. In another implementation, multiple projectors may be used, each receiving and superimposing one of the two or more low-resolution signals.

In this disclosure, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

According to an aspect of this disclosure, a system for projecting an image with an increased apparent display resolution is provided. The system includes a resampler module, one or more projectors, and a deconvolution module. The resampler module is configured to receive a high-resolution signal, upsample the high-resolution signal, perform an integer shift operation, and downsample to two or more low-resolution signals. The deconvolution module is configured to filter the high-resolution signal using a spatial domain deconvolution operation, the spatial domain deconvolution operation approximating frequency domain optical corrections based on characteristics of the one or more projectors. The one or more projectors are configured to receive the two or more low-resolution signals and superimpose the two or more low-resolution signals to project the image with an increased apparent display resolution.

In some implementations, the spatial domain deconvolution operation uses a spatial kernel comprising a spatial approximation of a frequency domain Wiener deconvolution filter for optical corrections based on characteristics of the one or more projectors.

In some implementations, the spatial kernel is an N×N spatial kernel, where N is an odd number.

In some implementations, the one or more projectors comprises one projector configured to receive the two or more low-resolution signals, the projector having an optomechanical shifter to offset the projected image.

In some implementations, the one or more projectors comprises two or more projectors, each configured to receive one of the two or more low-resolution signals and project the image.

According to another aspect of the disclosure, a method for projecting an image with an increased apparent display resolution using one or more projectors is provided, the method comprising: receiving a high-resolution signal; upsampling the high-resolution signal; filtering the upsampled high-resolution signal using a spatial domain deconvolution operation, the spatial domain deconvolution operation approximating a frequency domain optical correction based on characteristics of the one or more projectors; downsampling the high-resolution signal to a first low-resolution signal; performing an integer shift operation and downsampling the high-resolution signal to a second low-resolution signal; and the one or more projectors receiving and superimposing the first and second low-resolution signals to project an image with an increased apparent display resolution.

In some implementations, the spatial deconvolution operation uses a deconvolution spatial kernel comprising a spatial approximation of a frequency domain Wiener deconvolution filter for optical corrections based on characteristics of the one or more projectors.

In some implementations, the deconvolution spatial kernel is generated by: estimating a point spread function of the one or more projectors; constructing a Wiener filter based on the point spread function; and generating a spatial domain Wiener filter by applying an inverse Fourier transform of the Wiener filter and extracting a spatial kernel.

In some implementations, the method further comprises applying a band limit to the Wiener filter prior to applying the inverse Fourier transform.

In some implementations, the spatial kernel is an N×N spatial kernel, where N is an odd number.

In some implementations, the method further comprises altering a cut-off frequency of the band limit applied to the Wiener filter for content-specific use cases.

In some implementations, estimating the point spread function of the one or more projectors comprises capturing a single pixel response of the one or more projectors.

In some implementations, the method further comprises preprocessing to perform geometric, photometric and color calibrations of each of the two or more projectors.

In some implementations, upsampling is performed to a resolution of twice the resolution of the one or more projectors.

In some implementations, two projectors are used, wherein each of the low-resolution signals contains half the pixels of the high-resolution signal.

In some implementations, the two projectors receive and superimpose the first and second low-resolution signals at twice the speed.

In some implementations, four projectors are used, and the method further comprises: performing an integer shift operation and downsampling the high-resolution signal to a third low-resolution signal; and performing an integer shift operation and downsampling the high-resolution signal to a fourth low-resolution signal; wherein each of the low-resolution signals contains one quarter of the pixels of the high-resolution signal.

In some implementations, the four projectors receive and superimpose the low-resolution signals at four times the speed.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
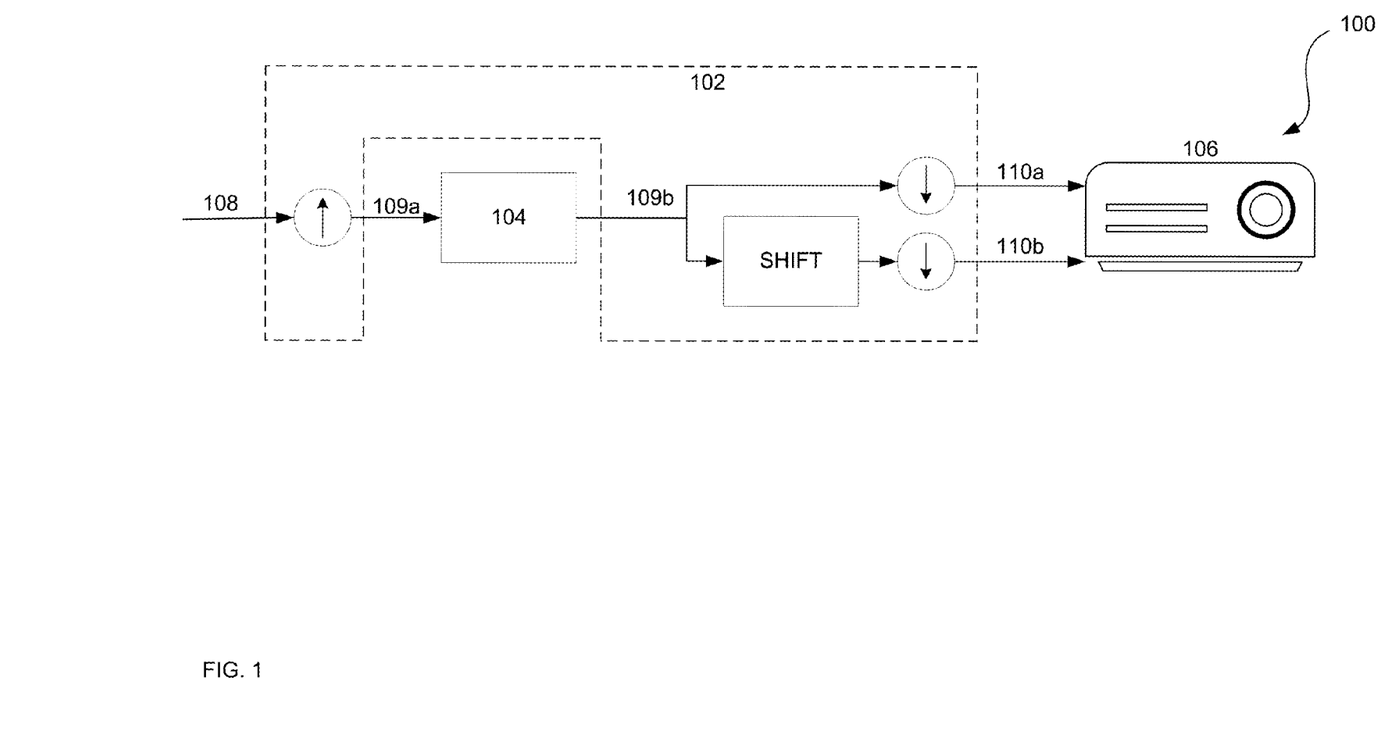
FIG. 1 depicts a projection system for projecting an image with an increased apparent display resolution using two low-resolution signals, according to a non-limiting embodiment.

FIG. 1 depicts a system 100 for projecting an image with an increased apparent display resolution. The system 100 includes a resampler module 102, a deconvolution module 104, and one or more projectors such as projector 106. The resampler module 102, deconvolution module 104 and projector 106 are mutually coupled to send and receive image or video signals for processing and projection.

Before discussing the operation of system 100 in detail, the components of system 100 will be described further.

Projector 106 can be any suitable type of projector, or combination of projectors, such as, but not limited to a DMD (digital micromirror device), an LCOS (Liquid Crystal on Silicon) device and the like. Projector 106 thus includes one or more light sources, one or more modulating elements for modulating light from the light sources to produce a desired image, and a lens assembly for directing the modulated light.

The resampler module 102 is generally configured to receive a high-resolution signal 108, upsample the high-resolution signal to an upsampled high-resolution signal 109a, perform an integer shift operation on the signal 109b output from deconvolution module 104, and downsample the signal 109b output from deconvolution module 104 to two or more low-resolution signals 110a and 110b.

The deconvolution module 104 is generally configured to filter the upsampled high-resolution signal 109a using a spatial domain deconvolution operation to output a filtered upsampled signal 109b, the spatial domain deconvolution operation approximating frequency domain optical corrections based on characteristics of the projector 106. The spatial domain deconvolution operation pre-compensates images to correct for optical blur. In this case, the blur is caused by the projector lens, as well as the blur caused by the pixels of the projector 106 being larger than the content pixels (e.g. the pixels of the high-resolution signal 108).

The resampler module 102 and the deconvolution module 104 are preferably built in to the projector 106, for example by configuring existing FPGA (field-programmable gate array) hardware to perform the functions of resampler module 102 and deconvolution module 104.

Figure 2:
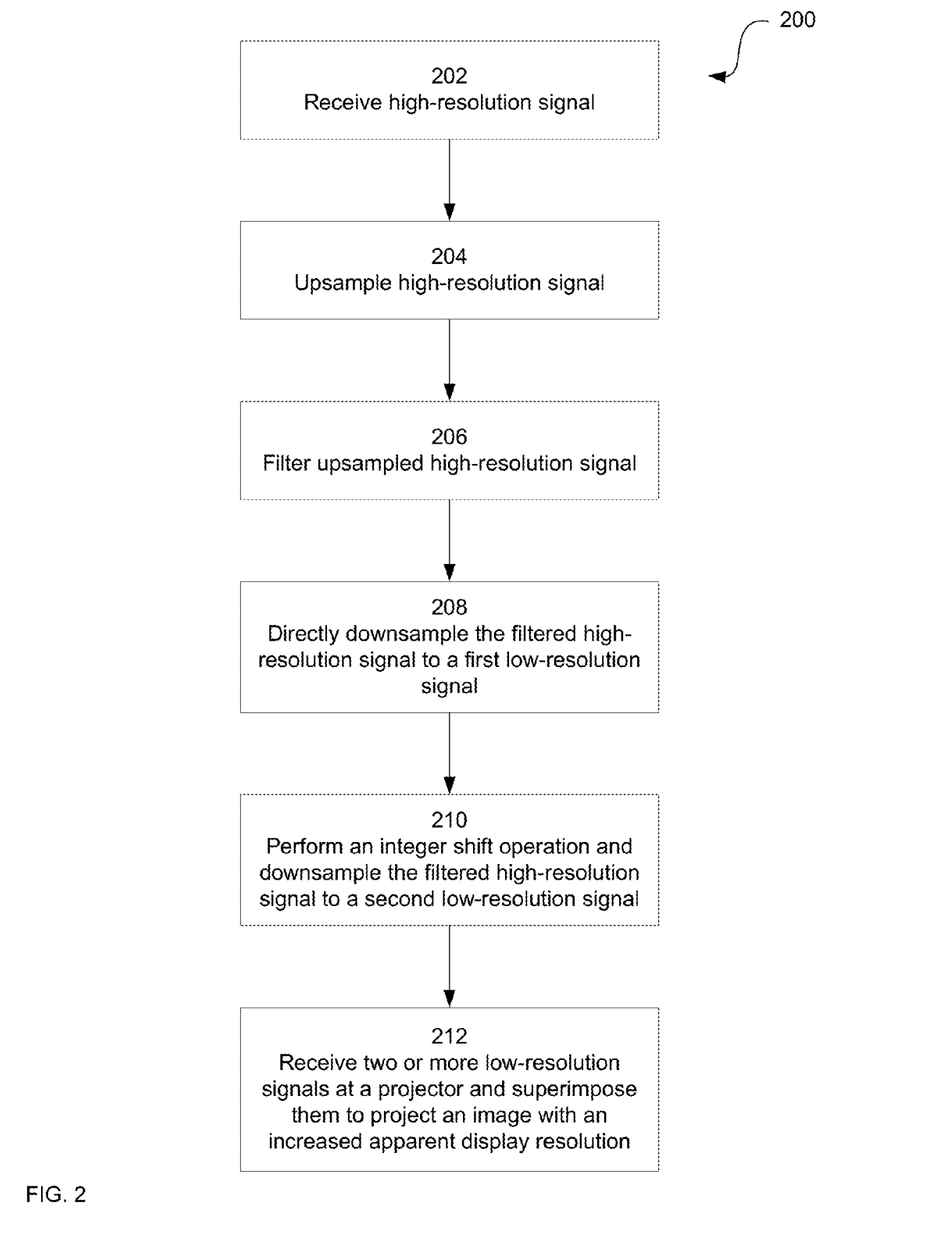
FIG. 2 depicts a method of projecting an image with an increased apparent display resolution, according to a non-limiting embodiment.

Having described the components of system 100, the operation of system 100 will now be described in detail, with reference to FIG. 2. FIG. 2 depicts a method 200 of projecting images with an increased apparent display resolution. In order to assist in the explanation of the method 200, it will be assumed that the method 200 is performed using the system 100, although it is contemplated that method 200 can also be performed by other suitable systems.

At block 202, the resampler module 102 receives a high-resolution signal 108.

At block 204, the resampler module 102 upsamples the high-resolution signal 108.

Preferably, the high-resolution signal is upsampled to a resolution of twice the resolution of the projector 106, resulting in upsampled high-resolution signal 109a to match the resolution of the spatial kernel generated by the deconvolution module 104, as described below.

At block 206, the deconvolution module 104 filters the upsampled high-resolution signal 109a using a spatial deconvolution operation, the spatial deconvolution operation approximates a frequency domain optical correction based on characteristics of the projector 106.

Preferably, the spatial deconvolution operation uses a spatial kernel derived by estimating a point spread function of the projector 106, constructing a Wiener filter based on the point spread function, and generating a spatial domain Wiener filter by applying an inverse Fourier transform or an inverse fast Fourier transform (IFFT) of the Wiener filter and thereby extract the spatial kernel. The resulting spatial kernel is a spatial approximation of a frequency domain optical aberration correction filter, also referred to as the spatial domain Wiener filter.

The first step towards defining the spatial domain Wiener filter is to estimate the point spread function (PSF) which describes how the projector 106 and optical system respond to a point source, or the impulse response. To accurately measure the PSF of the projector 106 a lens-free camera may be used. The lens-free camera is configured to capture the single pixel response of the projector. Specifically, a single pixel may be projected directly into a complementary metal-oxide-semiconductor (CMOS) active-pixel sensor (APS) of the lens-free camera.

When a single projector is used, the estimation may be obtained under the assumption that the PSF is spatially invariant: the single pixel response is uniform across the projected area. When multiple projectors of similar quality are used, the assumption that the PSF is spatially invariant and consistent across each projector may be used. Alternately, a separate PSF may be estimated for each projector and result in distinct spatial domain Wiener filter for each projector.

The PSF and the projector video content should be moved into the same registration. As described above, the high-resolution signal (i.e. projector video content) is preferably upsampled to twice the resolution of the projector. Since the camera capturing the PSF of the projector will generally have a higher resolution than the projector itself, the PSF image as captured by the camera is downsampled so that the pixels of the PSF image are matched in size to the upsampled high-resolution signal 109a (i.e. the content pixels).

After obtaining the PSF of the projector 106, the frequency domain Wiener filter is constructed. The Wiener filter is based on the estimated PSF and an assumption of global additive noise level n(i, j), and is given by the following equation:

$$G(u, v) = \frac{1}{H(u, v)} \left[ \frac{|H(u, v)^2|}{|H(u, v)^2| + \frac{N(u, v)}{X(u, v)}} \right]$$

where X(u, v), H(u, v) and N(u, v) are the Fourier transform of the original signal x(i,j), the PSF h(i, j) and the additive noise n(i, j), respectively. N/X can be reduced into a constant additive noise ratio n. With a small value of n, the Wiener filter becomes very nearly the inverse of the frequency-domain PSF.

Figure 3:
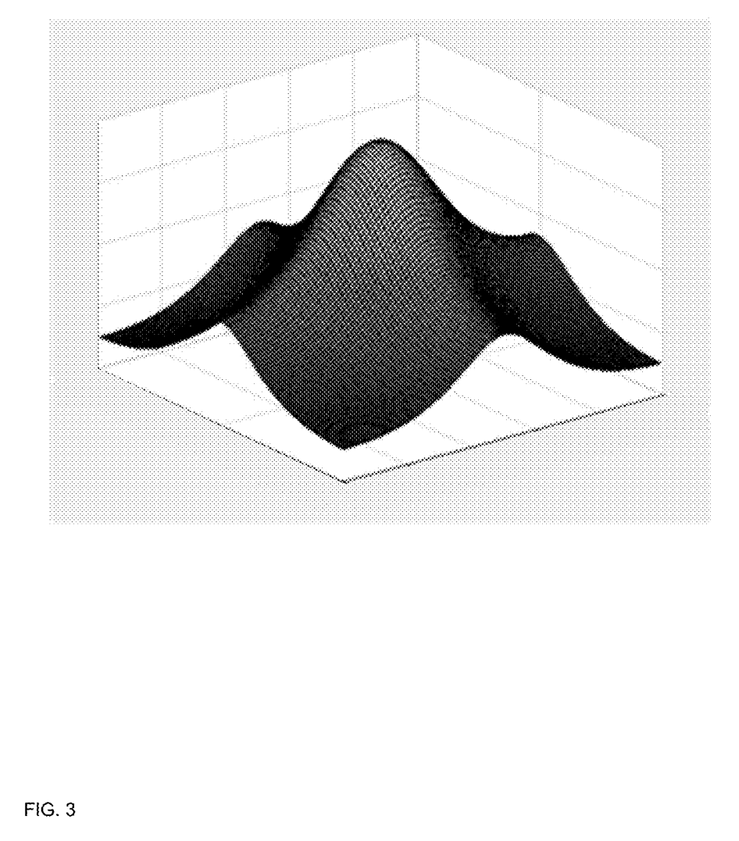
FIG. 3 depicts a sample plot of a Fourier transform of a point spread function.
Figure 4:
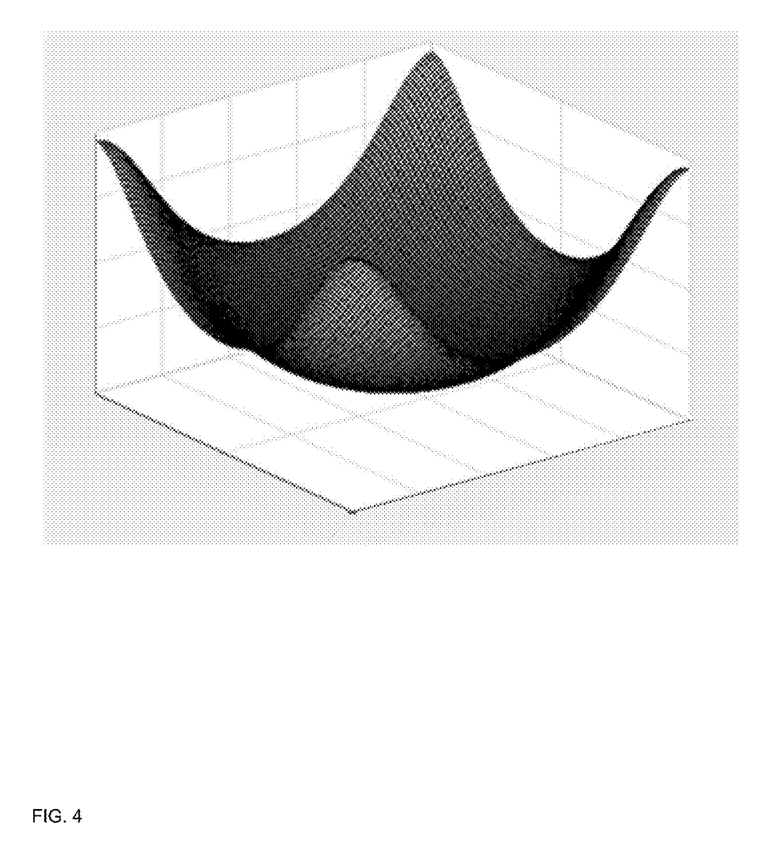
FIG. 4 depicts a sample plot of a Wiener filter.

FIGS. 3 and 4 show sample plots of H (the Fourier transform of the PSF) and G (the Wiener filter) with n=0.0001 for a 3×3 PSF.

As can be seen from FIG. 4, the Wiener filter has most of its content at high frequencies, corresponding to strong features on the scale of one pixel of the upsampled high-resolution signal 109. These strong high frequency terms generally do not have physical meaning and require carrying more terms through the image processing until their impact fully cancels out. Taking the IFFT of the Wiener filter results in a spatial kernel that has a lot of energy at the center. Thus, the resulting spatial domain Wiener filter will have an over-sharpening effect. Further, the energy of the resultant spatial kernel is not localized at the center, making it difficult to approximate using a spatially smaller kernel.

Figure 5:
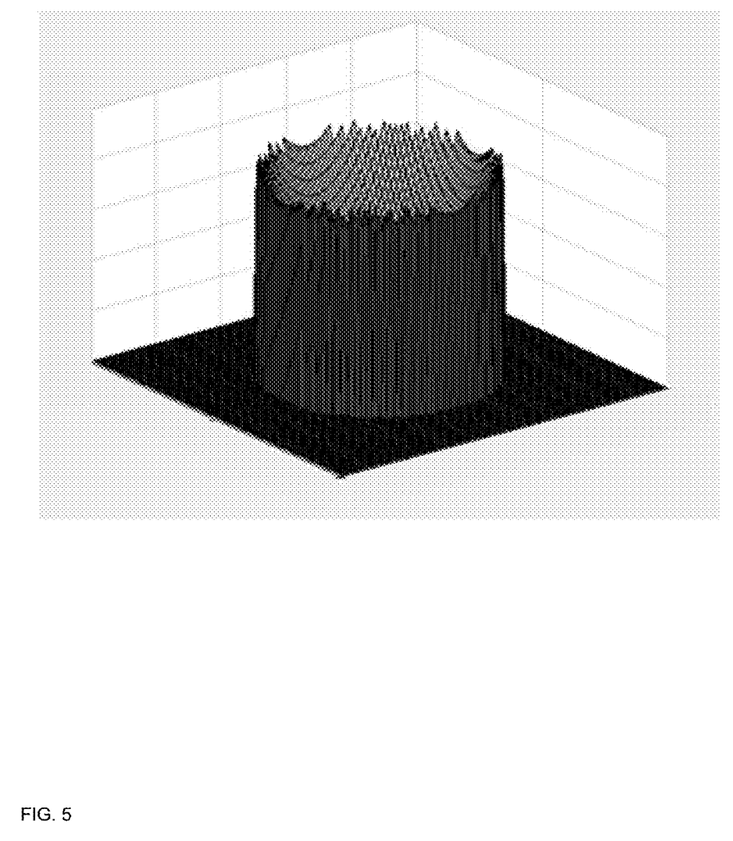
FIG. 5 depicts a sample plot of the Wiener filter of FIG. 4 with a band limit added.

For improved results, a band limit may be added to the Wiener filter to attenuate high frequency components. FIG. 5 shows the Wiener filter of FIG. 4 with a band limit added in the shape of a circle with a set radius, with terms set to 1 outside the band limit circle. By setting an appropriate band limit, the effect of the Wiener filter may be retained with far less high frequency content. The cut-off frequency of the band limit applied to the Wiener filter can be altered for content-specific use cases. For example, the band limiting parameter may be set to a first value for good resolution enhancement with zero or near-zero artifacts, or to a second value for further improved resolution enhancement with mild artifacts. Thus, the size of the band limiting circle applied to the Wiener filter can be used as a performance tuning parameter.

The spatial equivalent to the band limited Wiener filter is found by calculating its IFFT and extracting the spatial kernel.

Figure 6:
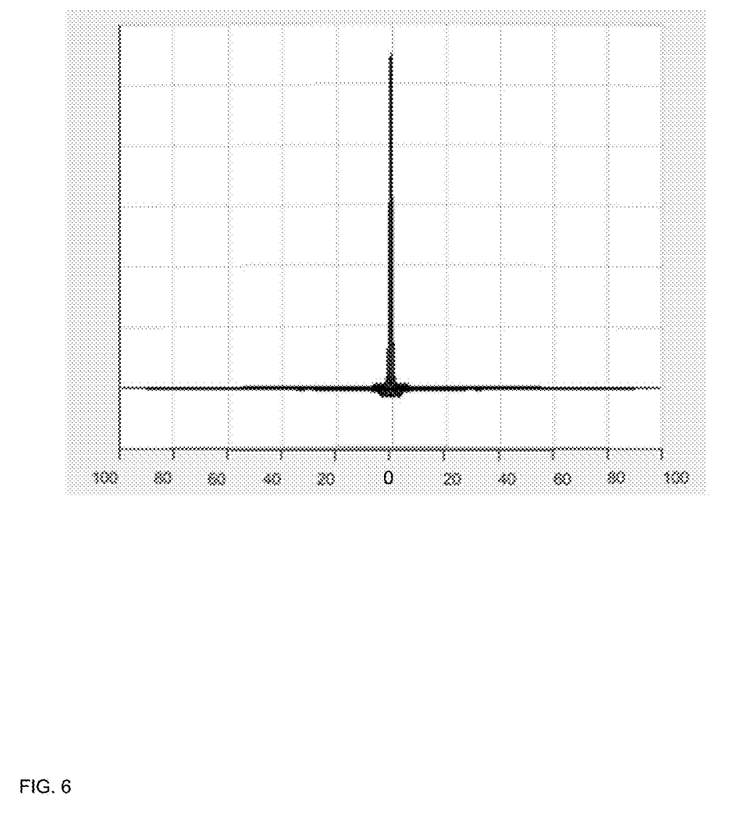
FIG. 6 depicts a sample band-limited spatial domain Wiener filter.
Figure 7:
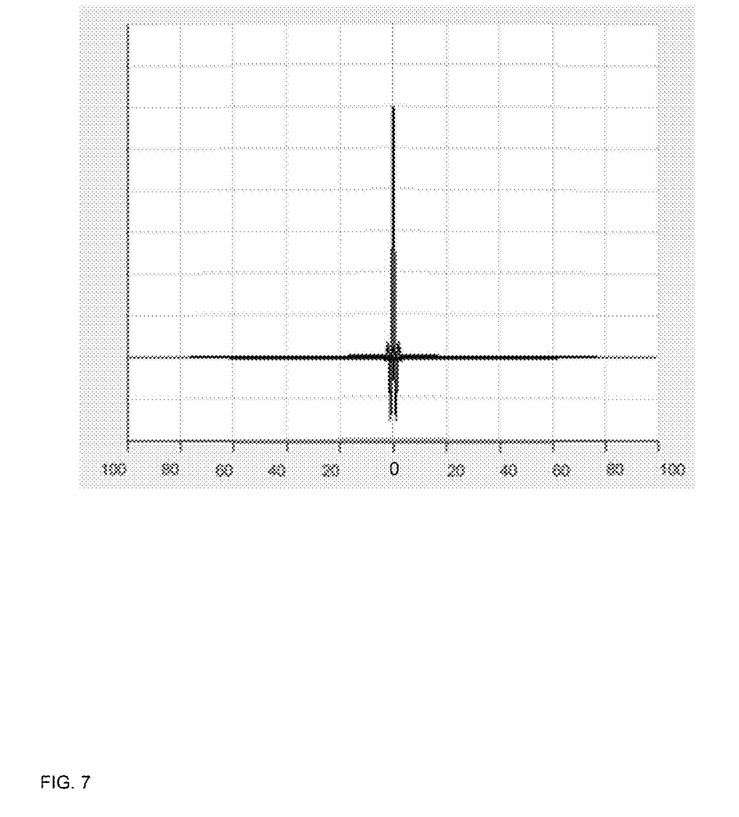
FIG. 7 depicts a sample spatial domain Wiener filter.

FIGS. 6 and 7 show the full result of the IFFT of the Wiener filter with and without a band limit applied to the Wiener filter, respectively. Increments in the horizontal plane correspond to ½ imager pixels (i.e. pixels of the upsampled high-resolution signal 109). The spatial kernel has terms confined within a small number of ½ imager pixels. The non-band limited spatial domain Wiener filter in FIG. 7 has more terms and at larger positive and negative values. More terms in the spatial kernel require much larger image processing resources and large swings in the terms increase the risk of image artifacts.

Figure 8:
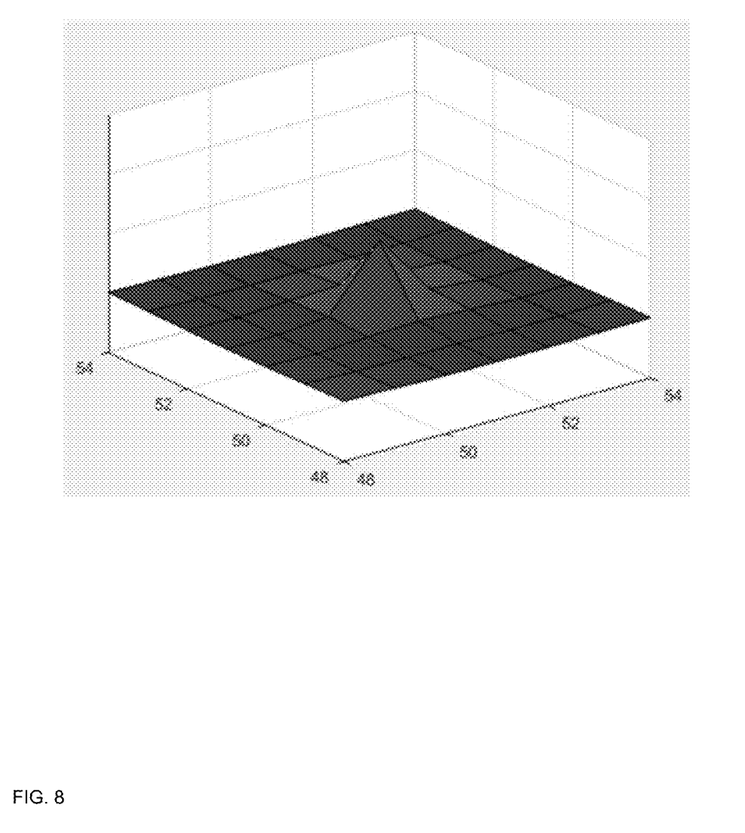
FIG. 8 depicts a sample N×N band-limited spatial domain Wiener filter.
Figure 9:
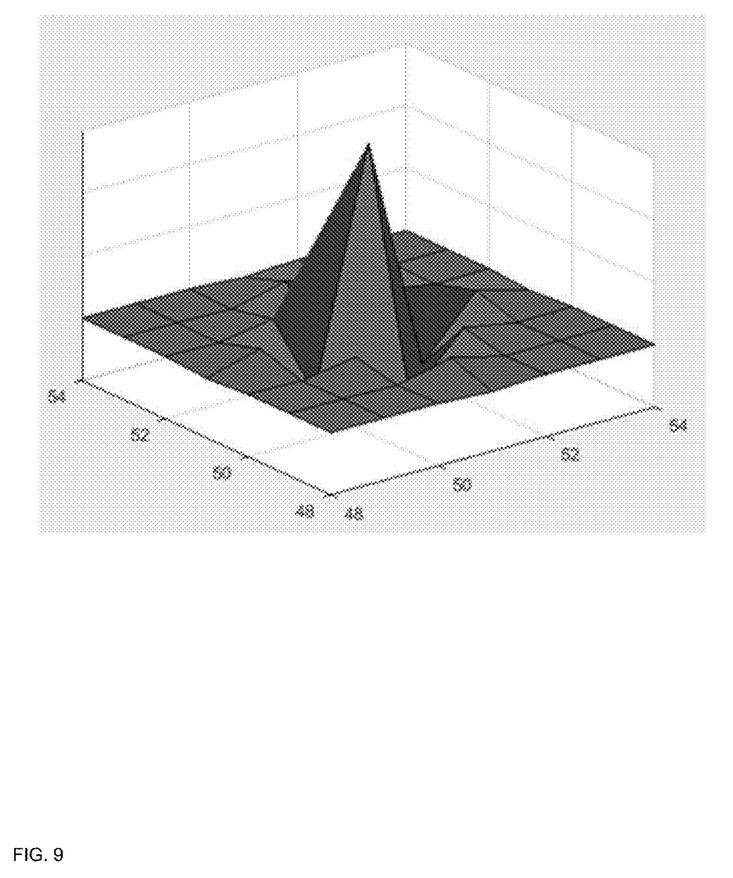
FIG. 9 depicts a sample N×N spatial domain Wiener filter.

Since the spatial domain Wiener filter is largely centralized, the spatial kernel can be limited in size. FIGS. 8 and 9 show a sample N×N spatial kernel extracted from the band-limited and non band-limited IFFT of the Wiener filters of FIGS. 6 and 7 respectively. Generally, N should be an odd number so the filter can be centered over a pixel.

The spatial kernel is applied to each pixel in the upsampled high-resolution signal 109 by centering the spatial kernel over the pixel, multiplying the spatial kernel values with the corresponding nearby pixel values and summing the results.

Referring again to FIG. 2, at block 208, the resampler module 102 directly downsamples the filtered upsampled high-resolution signal 109b to a first low-resolution signal 110a.

At block 210, the resampler module 102 performs an integer shift operation and downsamples the filtered upsampled high-resolution signal 109b to a second low-resolution signal 110b.

In an embodiment, a two-way resolution enhancement is performed. In this embodiment, the resampler module 102 may downsample the filtered upsampled high-resolution signal 109b into first and second low-resolution signals 110a and 110b, each containing half the pixels of the upsampled high-resolution signal. In another embodiment, a four-way resolution enhancement is performed, wherein the resampler module 102 may perform further integer shift and downsampling operations to a third and fourth low-resolution signals. In this embodiment, each of the four low-resolution signals may contain one quarter of the pixels of the upsampled high-resolution signal.

At block 212 of FIG. 2, the projector 106 receives first and second low-resolution signals 110a and 110b and superimposes them to project an image with an increased apparent display resolution.

In the two-way resolution enhancement embodiment, the projector 106 may receive and superimpose the first and second low-resolution signals 110a and 110b at twice the speed of the high-resolution signal. In the four-way resolution enhancement embodiment, the projector 106 may receive and superimpose the first, second, third and fourth low-resolution signals at four times the speed of the high-resolution signal.

In an embodiment, the one or more projectors may comprise one projector 106 to receive and project the two or more low-resolution signals using an opto-mechanical shifter that offsets the projected image. The sub-frames generated by the low-resolution signals, given high frame rate, are merged by the human visual system (HVS) into a single high-resolution image allowing the viewer to see a high-resolution projection that approximates the original high-resolution source.

In another embodiment, the one or more projectors may comprise two or more projectors 106, each configured to receive one of the two or more low-resolution signals and project the image. In this embodiment, all offset sub-frames are projected at the same time. Using multiple low-resolution projectors may require preprocessing for geometric, photometric and color calibrations.

For example, in the two-way resolution enhancement, two projectors 106 may be used. Each projector 106 is configured to receive one of the two low-resolution signals and superimpose the projected images. In another example, four projectors 106 may be used for the four-way resolution enhancement embodiment. Each projector 106 is configured to receive one of the four low-resolution signals and superimpose the projected images.

An opto-mechanical image shifter does not require calibration of color and projection positions as it uses one projector; however, multiple sub-frames cannot be projected at the same time. Multiple low-resolution projectors fusion requires calibration of position and color for all used projectors, however all sub-frames can be projected at the same time.

Thus, as set out above, system 100 and method 200 allow for the projection of an image with an increased apparent display resolution. Unlike traditional spatial based and frequency based approaches which are computationally expensive, the use of the N×N spatial domain Wiener filter simplifies filtering to a 2D convolution operation that can be implemented in real-time using existing FPGA resources. Further, the spatial nature of the approach enables many frequency-based limitations to be overcome. For example, a-priori knowledge needed for problem regularization can be avoided.

The system and method described can be implemented on a single projector using an opto-mechanical shifter, and can also be extended to multiple projector systems. The extension of the system and method to multiple projector systems is straightforward preprocessing for geometric, photometric and color calibrations between the projectors and does not require substantial changes to the resampler module, deconvolution module, or spatial kernel calculations.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system for projecting an image comprising:
a resampler circuit configured to receive a high-resolution signal, upsample the high-resolution signal, perform an integer shift operation and downsample to two or more low-resolution signals;
one or more projectors configured to receive the two or more low-resolution signals and superimpose the two or more low-resolution signals to project the image with an increased display resolution; and
a deconvolution circuit configured to filter the high-resolution signal using a spatial domain deconvolution operation, the spatial domain deconvolution operation approximating frequency domain optical corrections based on characteristics of the one or more projectors, wherein the spatial domain deconvolution operation uses a deconvolution spatial kernel comprising a spatial approximation of a frequency domain Wiener deconvolution filter for optical corrections based on characteristics of the one or more projectors, and
the deconvolution spatial kernel is generated by: estimating a point spread function of the one or more projectors; constructing a Wiener filter based on the point spread function; and generating a spatial domain Wiener filter by applying an inverse Fourier transform of the Wiener filter and extracting a spatial kernel.

2. The system of claim 1 wherein the spatial kernel is a N×N spatial kernel, where N is an odd number.

3. The system of claim 1 wherein the one or more projectors comprises one projector configured to receive the two or more low-resolution signals, the projector having an opto-mechanical shifter to offset the projected image.

4. The system of claim 1 wherein the one or more projectors comprises two or more projectors, each configured to receive one of the two or more low-resolution signals and project the image.

5. A method for projecting an image, using one or more projectors, the method comprising:
  receiving a high-resolution signal;
  upsampling the high-resolution signal;
  filtering the upsampled high-resolution signal using a spatial domain deconvolution operation, the spatial domain deconvolution operation approximating a frequency domain optical correction based on characteristics of the one or more projectors;
  downsampling the high-resolution signal to a first low-resolution signal;
  performing an integer shift operation and downsampling the high-resolution signal to a second low-resolution signal; and
  the one or more projectors receiving and superimposing the first and second low-resolution signals to project an image with an increased display resolution,
  wherein the spatial domain deconvolution operation uses a deconvolution spatial kernel comprising a spatial approximation of a frequency domain Wiener deconvolution filter for optical corrections based on characteristics of the one or more projectors, and
  the deconvolution spatial kernel is generated by: estimating a point spread function of the one or more projectors; constructing a Wiener filter based on the point spread function; and generating a spatial domain Wiener filter by applying an inverse Fourier transform of the Wiener filter and extracting a spatial kernel.

6. The method of claim 5 further comprising applying a band limit to the Wiener filter prior to applying the inverse Fourier transform.

7. The method of claim 6 wherein the spatial kernel is an N×N spatial kernel, where N is an odd number.

8. The method of claim 6 further comprising altering a cut-off frequency of the band limit applied to the Wiener filter for content-specific use cases.

9. The method of claim 5 wherein estimating the point spread function of the one or more projectors comprises capturing a single pixel response of the one or more projectors.

10. The method of claim 5 further comprising preprocessing to perform geometric, photometric and color calibrations of each of two or more projectors.

11. The method of claim 5 wherein the upsampling is performed to a resolution of twice the resolution of the one or more projectors.

12. The method of claim 11 using two projectors, and wherein each of the low-resolution signals contains half the pixels of the high-resolution signal.

13. The method of claim 12 wherein the two projectors receive and superimpose the first and second low-resolution signals at twice the speed.

14. The method of claim 11 using four projectors, the method further comprising:
  performing an integer shift operation and downsampling the high-resolution signal to a third low-resolution signal; and
  performing an integer shift operation and downsampling the high-resolution signal to a fourth low-resolution signal; and
  wherein each of the low-resolution signals contains one quarter of the pixels of the high-resolution signal.

15. The method of claim 14 wherein the four projectors receive and superimpose the low-resolution signals at four times the speed.

* * * * *